(12) United States Patent
Takada et al.

(10) Patent No.: US 6,303,246 B1
(45) Date of Patent: Oct. 16, 2001

(54) HERMETICALLY SEALED CELL AND SEALING BODY

(75) Inventors: Akiyoshi Takada, Shiga; Kinji Saijo, Yamaguchi; Kazuo Yoshida, Yamaguchi; Nobuyuki Yoshimoto, Yamaguchi; Yoshihiko Isobe, Yamaguchi, all of (JP)

(73) Assignee: Toyo Kohan Co., Ltd., Tokyo (JP)

( * ) Notice: Subject to any disclaimer, the term of this patent is extended or adjusted under 35 U.S.C. 154(b) by 0 days.

(21) Appl. No.: 09/423,433

(22) PCT Filed: May 8, 1998

(86) PCT No.: PCT/JP98/02054

§ 371 Date: Jan. 14, 2000

§ 102(e) Date: Jan. 14, 2000

(87) PCT Pub. No.: WO98/52238

PCT Pub. Date: Nov. 19, 1998

(30) Foreign Application Priority Data

May 9, 1997 (JP) .................................................... 9-134476

(51) Int. Cl.$^7$ .................................................... H01M 2/12
(52) U.S. Cl. ................................ 429/58; 429/53; 429/56; 429/64; 429/175
(58) Field of Search ................................ 429/53, 56, 58, 429/64, 175

(56) References Cited

U.S. PATENT DOCUMENTS 5,580,679 * 12/1996 Tanaka .................................. 429/185
5,766,791 * 6/1998 Takahashi et al. ...................... 429/57
5,818,198 * 10/1998 Mito et al. ............................. 320/112

FOREIGN PATENT DOCUMENTS

| 62-097256 | 5/1987 | (JP) . |
| 05-314959 | 11/1993 | (JP) . |
| 07-105933 | 4/1995 | (JP) . |
| 07-254402 | 10/1995 | (JP) . |

* cited by examiner

*Primary Examiner*—Hoa Van Le
(74) *Attorney, Agent, or Firm*—Browdy and Neimark

(57) ABSTRACT

The object of the present invention is to provide a closed battery capable of rapidly releasing the internal pressure thereof and at the same time disconnecting the current to effectively prevent itself from temperature rising and explosion so that it may assure the safety and reliability thereof, when the internal pressure is elevated due to short circuit, overcharge, reverse charge, or the like in such a completely closed battery. The formation of a valve element 5 whose center is eccentric to the center of a metal substrate 1 produces a slit 3 having a large width portion around the circumference of a valve element 5. When the internal pressure of a battery is elevated, the valve element 5 is smoothly raised up together with a metal foil 2 from the bending fulcrum portion 4 to thereby cut a lead wire 6 or permit a braze portion 8 to detach from the lead wire 6, thus reliably disconnecting the current. Then, the metal foil is allowed to burst stably and accurately at a prescribed pressure to thereby form a valve opening portion 7 so that the internal gas of the battery can be discharged. Thus, the battery can previously be prevented from exploding.

7 Claims, 4 Drawing Sheets

HERMETICALLY SEALED CELL AND SEALING BODY

CROSS REFERENCE TO RELATED APPLICATION

The present application is the national stage under 35 U.S.C. 371 of PCT/JP98/02054, filed May 8, 1998.

DETAILED DESCRIPTION OF THE INVENTION

1. Field of the Invention

The present invention relates to a closed battery capable of bursting at a prescribed pressure, especially at a low pressure, to rapidly release the internal pressure and at the same time to break a current, when the temperature or internal pressure of the battery is elevated, and to a closing member for use in the closed battery.

2. Prior Art

Recently, with increasing requirement of electronic devices that are made much smaller in size and light weight and have enhanced performance, the use of non-aqueous batteries with high energy density has become popular. Batteries which use an alkaline metal such as lithium, sodium, or potassium as an active material of negative electrode thereof employ battery containers of completely closed structure because the alkaline metal easily acts with water.

Such a completely closed battery has a merit of storability, but in reverse, its high sealability sometimes causes rupture of the battery itself due to the abnormally elevated internal pressure thereof in cases where the battery is exposed to high temperature, or a short circuit is formed inside or outside of the battery to cause a large flow of the current, or a hydrogen gas is generated in the battery due to water contamination penetrated in the manufacturing process thereof. In such a case, the device that accommodates such a rupturing battery will be broken and moreover, there may be a danger of the broken device and battery harming the user. Accordingly, there should be a request for some pressure releasing mechanism before the internal pressure of the battery is increased to such a high extent.

So far, several methods for releasing the internal pressure of a battery have been proposed and some of them have been used in practice. For instance, Japanese laid-open publication HEI 2-304861 discloses a safety valve for a battery, which comprises a valve chest provided at a part of a container of the battery and having a valve through hole to be communicated with the inside of the battery and an outlet to be communicated with the outside, the valve chest comprising a valve member at least whose surface opposed to the valve through hole is made of rubber, and an elastic member for pushing the above mentioned rubber surface of the valve member to the valve through hole. This safety valve holds the sealability of the battery by closing the valve through hole with the rubber-made valve member, and prevents the internal pressure of battery from rising in excess of a prescribed pressure by permitting the valve through hole to be opened when the internal pressure rises to the pressure presribed for the elastic member.

Such a conventional safety valve has been widely used in Ni-Cd type batteries. However, it has not yet been used in the non-aqueous batteries which employ alkaline metals as the active material of the negative electrode, since even if the elastic member presses the valve member to the valve through hole to thereby close the battery, it is impossible to obtain such a high sealability as required for the non-aqueous batteries.

One of the methods for releasing the internal pressure of a battery which requires high sealability is disclosed in Japanese laid-open publication SHO 63-285859. In this method, a container of the battery is provided with a thinned portion at a part of its wall. This thinned portion is formed by cold rolling a sheet of the vessel using a press device until the thickness of the rolled portion of the sheet becomes half of the initial thickness thereof. Thus, the battery is provided with good sealability with regard to this thinned wall portion because it is only transformed from a part of the continuous wall of the container.

Another pressure releasing mechanism of this type is disclosed in Japanese laid-open publication HEI-6-215760. This releasing mechanism comprises a valve diaphragm fitted in an open end of the cylindrical container of a battery having a bottom and disposed above the electrode element of the battery, and a lead for breaking current disposed above the valve diaphragm. In this structure, when the internal pressure of the battery is elevated, the valve diaphragm is expanded to rupture the lead for breaking current to break the current.

PROBLEM TO BE SOLVED BY THE INVENTION

According to the method as disclosed in Japanese laid-open publication SHO-63-285859, it is necessary to obtain a thinned wall portion of the container so that the thinned portion can be ruptured at a relaivley low pressure. However, when the wall portion is made too thinned, there may be formed fine or minute cracks during press-forming, thus impairing the sealability of the battery container.

Further, when metals are processed by cold working, they inevitably work harden. However, the hardening of the metals does not always takes place uniformly, and therefore, there arises a problem that the operating pressure for such pressure releasing mechanism cannot regularly be controlled. There has been further proposed a half-etching method for making thinner a part of the wall of a battery container, it is extremely difficult to control the remaining thickness of the thinned portion after etching, and also difficult to obtain a good yield. Another problem is that the half-etched portion cannot be free from the formation of pinholes, and therefore, all the products need to be inspected.

On the other hand, according to the method as disclosed in Japanese laid-open publication HEI-6-215760, it is necessary to accurately control the depth of a cut portion formed in the lead. This is a severe problem in view of its working process. Another problem is that the current is not reliably broken at a prescribed pressure.

With a view to solving the conventional drawbacks as mentioned above, it is an object of the present invention to provide a closed battery incorporating a valve chip which can be stably and accurately burst at a prescribed pressure, especially at a low pressure, so as to release the internal pressure thereof and can be manufactured easily, and provide a closing member for use in said closed battery.

MEANS FOR SOLVING THE PROBLEM

The present invention provides a closed battery which comprises: an electrode element consisting of a positive electrode, a negative electrode, and a separator; an electrolyte; a battery container accommodating said electrode element together with said electrolyte; and a closing member fitted in the inner periphery of an open end portion of said battery container to close the open end portion of the battery container, wherein said closing member consists of a metal substrate, a valve element which is provided with a slit in said metal substrate so as to serve as a releasing chip such that when the internal pressure of the battery is elevated, the valve element is bent from a bending fulcrum so as to provide the metal substrate with an opening portion for releasing the internal pressure, and a metal foil which is adhered to the inner surface of the metal substrate, wherein said valve element is defined by a slit having a width, in other words, the slit is formed between the circumference of the valve element and the metal substrate, and the center of the valve element is eccentric to the center of the metal substrate. The present invention also provides a closing member for use in said closed battery.

According to the present invention, when the internal pressure of a battery is elevated due to short circuit, overcharge, reverse charge, or the like, a valve chip consisting of a metal substrate in which a valve element is provided for releasing the internal pressure of the battery, and a metal foil which has a uniform and accurate thickness and is laid over the metal substrate so as to close a through hole which is usually closed with the valve element, operates to transform itself and push and raise the valve element. At this time, since the valve element is formed eccentrically to the metal substrate, the slit between them is allowed to have a wide width, which facilitates the operation of the valve chip V. When the valve chip is electrically disconnected and the internal pressure reaches to a prescribed pressure, the valve element is smoothly raised up thanks to the formation of such a wide slit, and the metal foil bursts stably and accurately to discharge the internal gas of the battery so that an abrupt rising of the internal temperature or explosion of the battery can previously be prevented.

PREFERRED EMBODIMENT

The present invention is now explained in conjunction with preferred embodiments and examples referring to the drawings. FIG. 1 is a vertical section view showing an upper part of a completely closed battery of the present invention. FIG. 2 is a plane view showing a valve chip of the closed battery of the present invention. FIG. 3 is a vertical section view showing the above mentioned valve chip. FIG. 4 and FIG. 5 are explanatory views showing operating manners of the valve chip in case of abnormality. FIG. 6 is a plane view showing another embodiment of the valve chip.

In FIG. 1, a cylindrical battery container 30 having a bottom, which serves as a negative electrode terminal, accommodates an electrode element 32 together with an electrolyte which are isolated from the outside. The electrode element 32 is constituted of a coiled laminate which comprises a positive electrode 32a, a separator 32b, and a negative electrode 32c disposed opposite to the positive electrode 32a via the separator 32b.

A closing cap 33 having through holes 0 and 0 which serves as a explosion-preventing mechanism and at the same time as a positive electrode terminal is fitted by calking in the upper open end portion of the container 30 via an insulating gasket 34. Above the electrode element 32, a saucer-like inner cap 37 is disposed and a gas release hole of a large diameter 35 is provided at the center portion of the inner cap 37.

Between the inner cap 37 and the closing cap 33, a valve chip V which forms a closing member for enclosing the electrode element and others is provided. A periphery 36 of the valve chip V is in contact with a periphery 33a of the closing cap 33. These peripheries 36 and 33a are fixed by calking in a circumference 37a of the inner cap 37 via an insulating gasket 40.

A lead wire 6 is attached, by an appropriate means, to an inner surface of the valve chip V serving as the closing member for closing the upperopen end portion of the battery. The lead wire 6 extends to the positive electrode 32a of the electrode element 32.

As shown in FIG. 2 and FIG. 3, the valve chip V is substantially circular in a plane view, and is composed of a metal substrate 1 having a circular form and a metal foil 2 adhered to the inner surface of the metal substrate. As a material of the metal substrate 1, any one selected from the group including a steel sheet, stainless steel sheet, copper sheet, and aluminum sheet may be used. As a material of the metal foil 2, any one selected from the group including a steel foil, stainless steel foil, copper foil, aluminum foil, nickel foil, and nickel-iron alloy foil may be used.

A valve element 5 is formed in the metal substrate 1 with the center thereof eccentric to that of the metal substrate 1 so that a slit 3 between the valve element and the metal substrate has a width positionally varied such that the slit may obtain a crescentic form. The slit 3 having such a width penetrates through the metal substrate entirely in its thickness direction. The valve element 5 has a part with no slit formed, which is to be a bending fulcrum portion 4. The slit 3 is so formed that a portion of the slit reverse to the bending fulcrum portion with regard to the center of the valve element 5 is provided with the maximum width of the slit and the width is gradually decreased from this maximum wide portion toward both ends of the slit 3. An inner portion defined by the slit 3 constitutes the valve element 5 which is to operate as a pressure releasing chip for releasing the internal pressure of the battery when the internal pressure is elevated. When the valve element 5 is raised up from the bending fulcrum portion 4, a valve opening portion 7 will be formed so as to release the internal pressure of the battery. (See FIG. 5.) The lead wire 6 is attached to the metal foil 2 through a braze portion 8, for instance.

Next, an operating manner of the valve chip in case of abnormality is explained. Now, a gas decomposed from the electrolyte of a battery is generated due to overcharge or the like, which raises the internal pressure of the battery. In this case, since the valve chip V is provided with the crescent-like slit 3 having a width which is positionally varied, the valve element 5 is smoothly raised up at a relatively low pressure and at a relatively large angle θ together with the metal foil 2, from the bending fulcrum portion portion 4, as shown in FIG. 4, to thereby permit the braze portion 8 to detach from the lead wire 6, thus reliably disconnecting the current. Then, a part of the metal foil 2 corresponding to the crescent-like slit 3 having a width which is positionally varied bursts to form the valve opening portion 7 so that the internal pressure is released outside. The gas generated from the electrolyte passes through the valve opening portion 7 and is discharged from the through holes 0 of the closing cap 33. Incidentally, while the valve element 5 is raised up from the metal substrate from the bending fulcrum portion 4, since the center C1 of the valve element is eccentric to the center C2 of the valve opening portion 7, there is produced a space wide enough to form a large valve opening portion.

The form of the valve element is not necessarily limited to the substantially circular form as shown in FIG. 2, but the valve element may be one as denoted by 10 in FIG. 6, which is provided with an arm portion 4a at the bending fulcrum portion 4. According to the composition of the present invention, in a completely closed battery, thanks to the formation of the slit 3 having a large width portion, when the internal pressure of the battery is elevated due to some abnormality such as short circuit, overcharge, or reverse charge, the valve element 5 is smoothly raised up together with the metal foil 2 from the bending fulcrum portion 4, as shown in FIG. 4, to thereby cut the lead wire or permit the braze portion 8 to detach from the lead wire 6, thus reliably disconnecting the current. Then, part of the metal foil 2 corresponding to the crescent-like slit 3 bursts to form the valve opening portion 7 so that the internal pressure is released outside. The gas generated from the electrolyte passes through the valve opening portion 7 and is discharged from the through holes 0 of the closing cap 33. As illustrated in FIG. 5 for explaining the operating manner of the valve chip V, once any case needs the valve chip to operate, it permits the valve opening portion 7 to be formed to thereby release the internal gas of the battery. Thus, the battery can previously be prevented from the abrupt rising of the internal temperature or explosion thereof. The operating pressure for the valve chip can be controlled by manufacturing the metal foil with the highest accuracy of its thickness in micron order. Further, the operating pressure can be predetermined within a stable pressure range by selecting the material composition of the valve chip and adjusting the length of the bending fulcrum portion 4.

EFFECT OF THE INVENTION

According to the safety valve chip of the present invention, when the internal pressure of a battery is elevated due to short circuit, overcharge, reverse charge, or the like, and at the time when it reaches to a prescribed pressure, the valve element can smoothly be raised up and the metal foil is allowed to burst stably and accurately even at a low pressure so as to release the internal gas of the battery. Thus, the battery can previously be prevented from the abrupt rising of the temperature or explosion thereof.

EXPLANATION OF REFERENCE CHARACTERS

Figure 1:
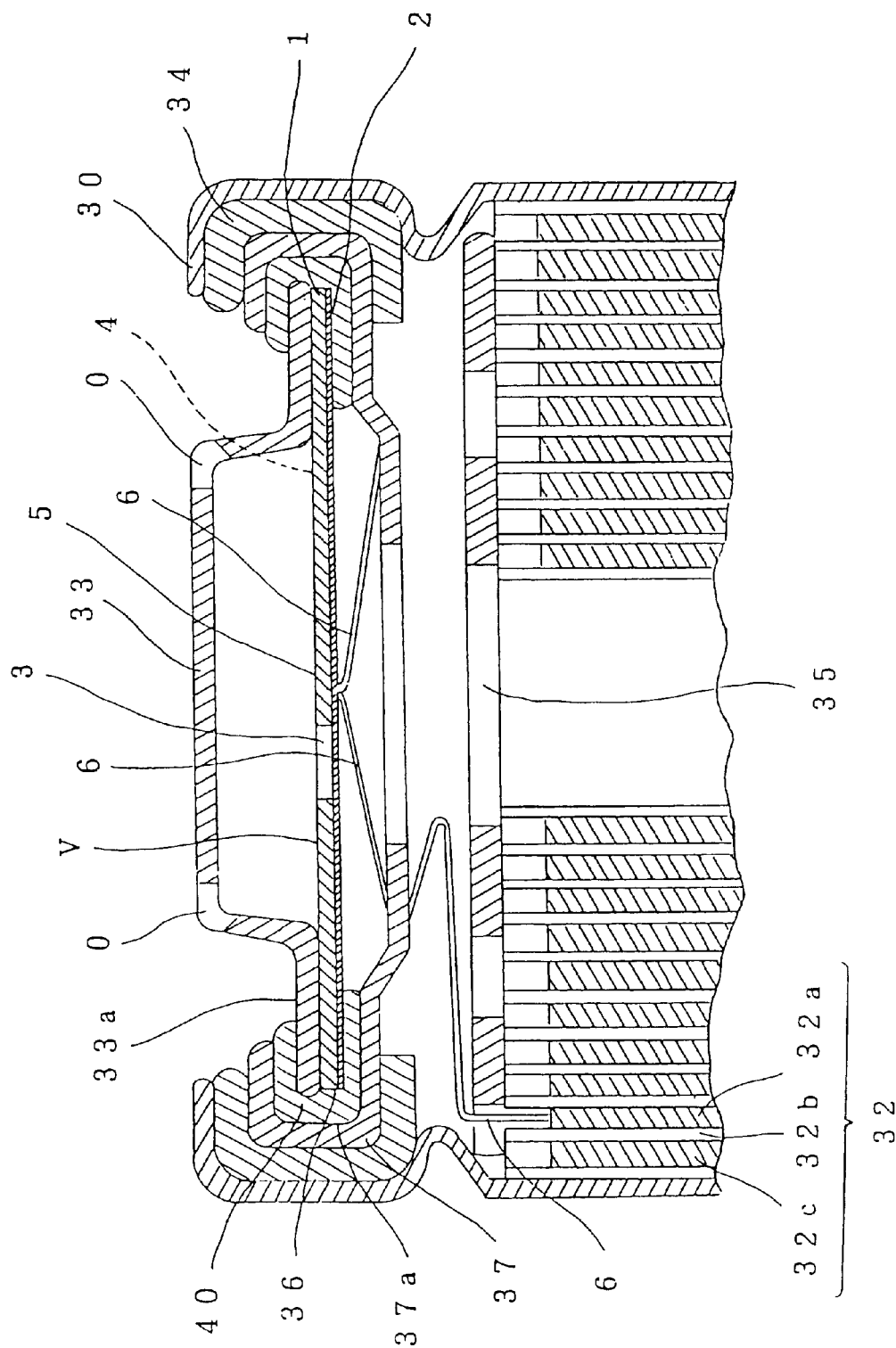
FIG. 1 is a vertical section view showing an upper part of the completely closed battery according to the present invention.
Figure 2:
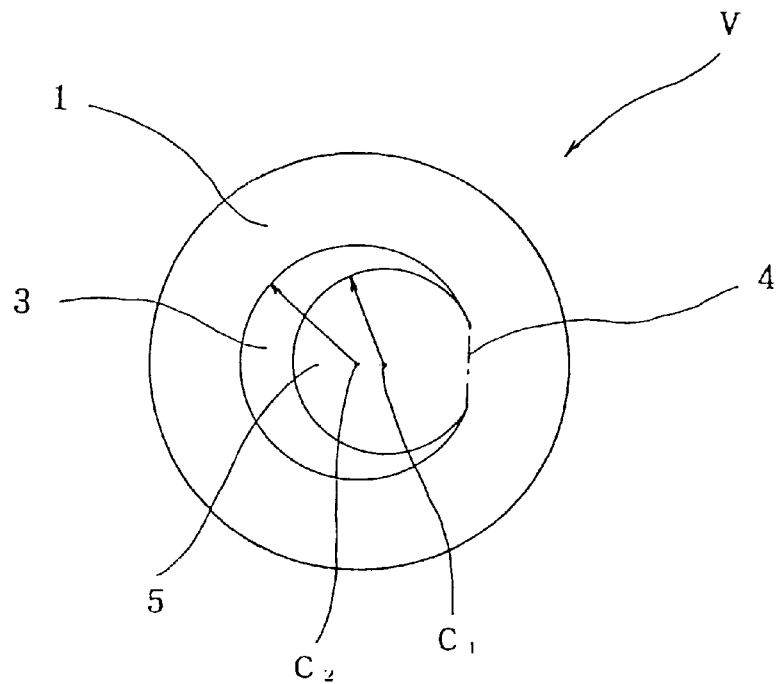
FIG. 2 is a plane view showing the valve chip according to the present invention.
Figure 3:
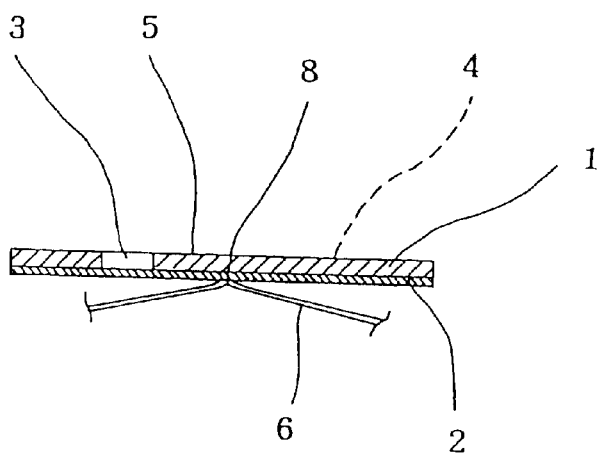
FIG. 3 is a section view taken along Y—Y in FIG. 2.
Figure 4:
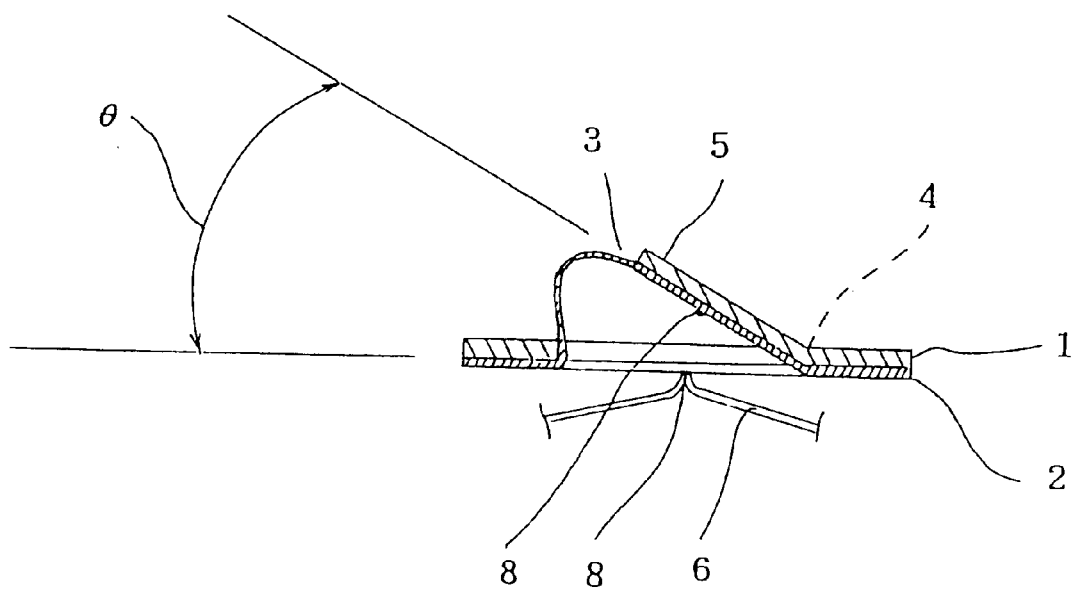
FIG. 4 is an explanatory view showing the operating manner of the valve chip in case of abnormality.
Figure 5:
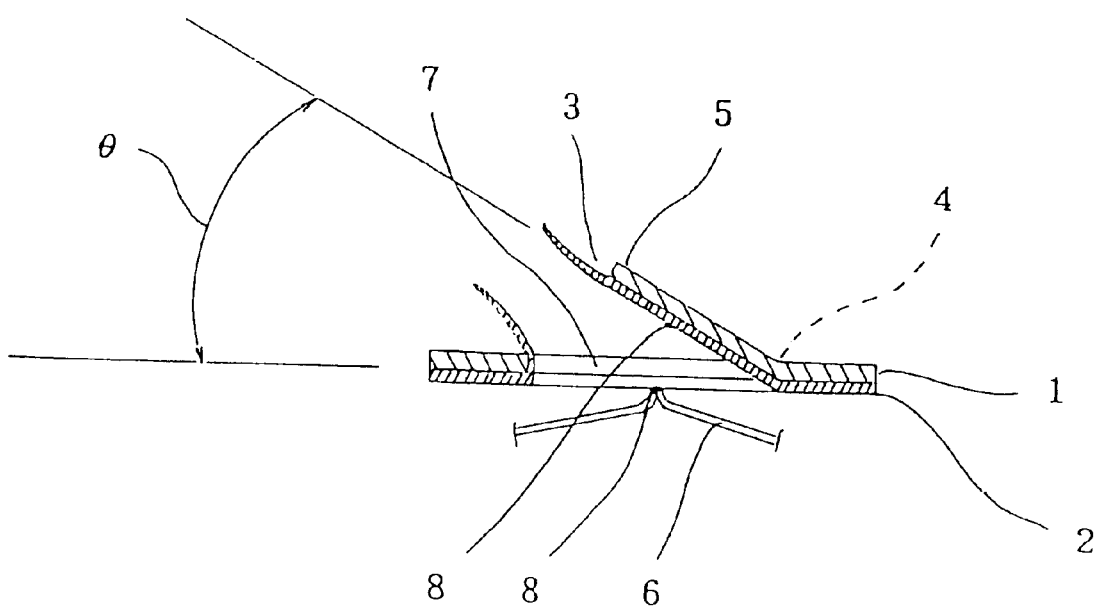
FIG. 5 is another explanatory view showing the operating manner of the valve chip in case of abnormality.
Figure 6:
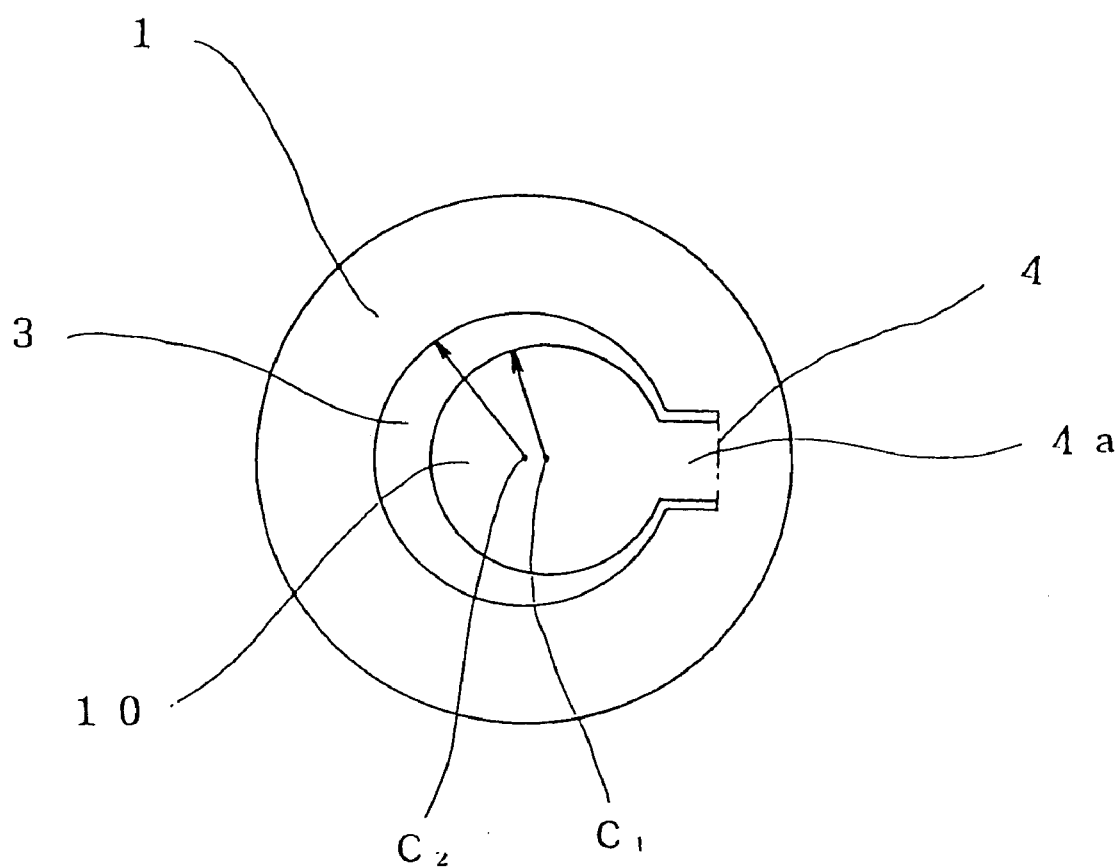
FIG. 6 is a plane view showing another embodiment of the valve chip according to the present invention.

1: metal substrate
2: metal foil
3: slit
4: bending fulcrum portion
5: valve element
6: lead wire
7: valve opening portion
8: braze portion
C1 : center of valve element
C2 :center of valve opening portion

What is claimed is:

1. A closed battery comprising: an electrode element consisting of a positive electrode, a negative electrode, and a separator; an electrolyte; a battery container accommodating said electrode element together with said electrolyte; and a closing member fitted in the inner periphery of an open end portion of said battery container to close the open end portion of the battery container, wherein said closing member consists of a metal substrate, a valve element which is provided in said metal substrate with a slit so as to serve as a releasing chip such that when the internal pressure of the battery is elevated, the valve element is bent from a bending fulcrum so as to provide the metal substrate with an opening portion for releasing the internal pressure, and a metal foil which is adhered to the inner surface of the metal substrate, wherein said valve element is provided with a slit between the circumference thereof and said metal substrate, and the center of said valve element is eccentric to the center of said metal substrate.

2. A closed battery according to claim 1, wherein said metal foil is connected with a lead member for conducting a current from the electrode element to a closing cap, and when said valve element operates to release the internal pressure, said lead member is electrically disconnected from the metal foil to break the current.

3. A closed battery according to claim 1, wherein said valve element has a substantially circular form and is provided around the circumference thereof with a slit whose width is positionally varied, and said valve element is provided with a part serving as a bending fulcrum portion.

4. A closed battery according to claim 3, wherein said valve element has a substantially circular form and is provided around the circumference thereof with a slit whose width is positionally varied, and the bending fulcrum is provided with an arm portion.

5. A closed battery according to claim 1, wherein said metal substrate is made of any one selected from the group including a steel sheet, stainless steel sheet, copper sheet, and aluminum sheet.

6. A closed battery according to claim 1, wherein said metal foil is any one selected from the group including a steel foil, stainless steel foil, copper foil, aluminum foil, nickel foil, and nickel-iron alloy foil.

7. A closing member incorporated into a closed battery according to claim 1.

* * * * *